United States Patent
Stiller

(10) Patent No.: US 8,335,610 B2
(45) Date of Patent: Dec. 18, 2012

(54) SELF-CONTAINED RIDE LEVEL CONTROL SYSTEM FOR A MOTOR VEHICLE

(75) Inventor: Alexander Stiller, Garbsen (DE)

(73) Assignee: Continental Aktiegesellschaft, Hannover (DE)

( * ) Notice: Subject to any disclaimer, the term of this patent is extended or adjusted under 35 U.S.C. 154(b) by 879 days.

(21) Appl. No.: 11/579,051

(22) PCT Filed: Feb. 14, 2005

(86) PCT No.: PCT/EP2005/050628
§ 371 (c)(1),
(2), (4) Date: Oct. 27, 2006

(87) PCT Pub. No.: WO2005/105492
PCT Pub. Date: Nov. 10, 2005

(65) Prior Publication Data
US 2008/0195277 A1   Aug. 14, 2008

(30) Foreign Application Priority Data

Apr. 29, 2004  (DE) .......................... 10 2004 021 170

(51) Int. Cl.
*G06F 7/00*   (2006.01)
*B60G 17/04*  (2006.01)
(52) U.S. Cl. ....................................................... 701/37
(58) Field of Classification Search .............. 701/36–38; 60/407–409, 415, 418, 453, 456; 280/5.5, 280/5.512–5.515, 6.152, 6.157, 6.158
See application file for complete search history.

(56) References Cited

U.S. PATENT DOCUMENTS

| | | | |
|---|---|---|---|
| 3,018,798 A * | 1/1962 | Bowlus | 137/627.5 |
| 6,266,590 B1 | 7/2001 | Kutscher et al. | |
| 2001/0005803 A1 | 6/2001 | Cochofel et al. | |
| 2002/0166321 A1 | 11/2002 | Oldenettel | |
| 2003/0107191 A1 | 6/2003 | Romer et al. | |
| 2005/0035562 A1 * | 2/2005 | Meier et al. | 280/6.15 |
| 2005/0276700 A1 * | 12/2005 | Hirota | 417/222.2 |
| 2006/0049606 A1 * | 3/2006 | Geiger et al. | 280/124.157 |
| 2007/0228676 A1 * | 10/2007 | Stegmann | 280/5.514 |

* cited by examiner

*Primary Examiner* — John Nguyen
*Assistant Examiner* — Rodney P King

(57) ABSTRACT

In a self-contained ride level control system for a motor vehicle, the accumulator pressure is controlled as follows: determination of the current pressure $Ps_{(current)}$ of the compressed air accumulator (4); definition of at least one level whereto the vehicle can be lifted or lowered; determination os the air volume required for lifting or lowering the motor vehicle from the current level and bringing it to a given level; determination of the subsequent accumulator pressure $Ps_{(later)}$ for reducing the current accumulator pressure $Ps_{(current)}$ if the motor vehicle is lifted from its current level up to the given level or determination of the subsequent accumulator pressure $Ps_{(later)}$ for increasing the current accumulator pressure $Ps_{(current)}$ if the motor vehicle has been lowered from the current level to the given level; filling the compressed air accumulator (4) with compressed air if the subsequent pressure $Ps_{(later)}$ is below a lower threshold value Ps (U) and emptying the compressed air accumulator if the subsequent pressure $Ps_{(later)}$ is higher than an upper threshold value (0).

9 Claims, 2 Drawing Sheets

SELF-CONTAINED RIDE LEVEL CONTROL SYSTEM FOR A MOTOR VEHICLE

This application is the U.S. national phase of international application PCT/EP05/50628 filed Feb. 14, 2005, which designated the U.S. and which claims the benefit of priority of German Patent Application Number 10 2004 021 170.1 filed Mar. 29, 2004. The contents of each of the aforementioned documents are incorporated herein in their entirety.

BACKGROUND OF THE INVENTION

The invention relates to a self-contained ride level control system for a motor vehicle with which the current ride level of the motor vehicle can be raised and lowered and which contains the following components:
 a compressor,
 a compressed air accumulator which can be filled with air from the atmosphere and which can be emptied into the atmosphere,
 at least one air spring, the air spring being connected to the compressed air accumulator via the compressor in such a way that compressed air can be transferred into the compressed air accumulator from the air spring and in the opposite direction.

Such a self-contained ride level control system is known, for example, from DE 101 22 567 C1. In the ride level control system which is known from this publication, the accumulator pressure of the compressed air accumulator is controlled indirectly by determining the quantity of air in the ride level control system by filling the compressed air accumulator with air from the atmosphere when the quantity of air in the ride level control system is below a lower limit, and the compressed air accumulator is emptied into the atmosphere when the quantity of air within the ride level control system is above an upper limit. Here, the control is performed in such a way that the quantity of air in the ride level control system is in a working range between the lower and upper limits after the filling or emptying process. The method therefore ensures that the quantity of air in the ride level control system is always kept in a certain working range and as a result the accumulator pressure in a specific state of the motor vehicle is also always in a specific range. The working range for the quantity of air is selected here in such a way that in a specific normal state of the motor vehicle the accumulator pressure is in a range in which both rapid raising and lowering of the motor vehicle are possible. The accumulator pressure merely needs to be equalized by filling or emptying the compressed air accumulator if, owing to leakage or large temperature fluctuations, it has become apparent that the quantity of air in the ride level control system is outside the working range (and consequently the accumulator pressure is outside the desired range). The compressor of the ride level control system is therefore activated only rarely in order to fill the compressed air accumulator so that the compressor running times are shortened and the compressor service life is extended. However, it is to be noted that the compressed air accumulator of the ride level control system is filled or emptied even if the quantity of air in the ride level control system is outside the working range even though in this case it would have still been possible to perform a large number of requested ride level changes for the motor vehicle using the ride level control system. This case can occur, for example, if the motor vehicle has been parked in a warm garage and is subsequently driven in a cold environment. Owing to the drop in temperature the quantity of air in the ride level control system is then reduced and as a result the compressed air accumulator is filled if the quantity of air is outside the working range. The filling process is performed even though a large number of requested control processes would still be possible with the ride level control system.

The invention is based on the object of providing a self-contained ride level control system for a motor vehicle in which the accumulator pressure has to be adjusted as rarely as possible by filling or emptying.

SUMMARY OF THE INVENTION

According to the invention, the object is achieved in that the accumulator pressure is controlled as follows:
 the current accumulator pressure is determined,
 at least one ride level to which the motor vehicle can be raised or lowered is predefined,
 the quantity of air which is required to raise or lower the motor vehicle from the current ride level to the predefined ride level is determined,
 the later accumulator pressure by which the current accumulator pressure would be lowered if the motor vehicle were to be raised from the current ride level to the predefined ride level is determined or the later accumulator pressure to which the current accumulator pressure would rise if the motor vehicle were lowered from the current ride level into the predefined ride level is determined,
 the compressed air accumulator is filled with compressed air if the later accumulator pressure would be below a lower limiting value, and the compressed air accumulator is emptied if the later accumulator pressure would be above an upper limiting value.

The actual control process for raising or lowering the vehicle body of the motor vehicle is not performed until after the compressed air accumulator has been filled or after it has been emptied when the respective specified condition is fulfilled. Under certain circumstances so much compressed air is filled into or let out of the compressed air accumulator that after the filling or letting out process the accumulator pressure corresponds to the lower limiting value or to the upper limiting value or is between the limiting values.

The advantage which is achieved with the invention is in particular the fact that the filling and emptying of the compressed air accumulator do not take place automatically and are independent of a control process if the current accumulator pressure is outside a specific range. Instead, the compressed air accumulator is filled or emptied, and the current accumulator pressure in the compressed air accumulator is thus changed, only if the later accumulator pressure (that is to say the accumulator pressure after the control process has been terminated) would be below a lower limiting value or above an upper limiting value. This procedure therefore provides the advantage that the number of cases in which the accumulator pressure of the compressed air accumulator is adapted is very low. As a result, the compressor for filling the compressed air accumulator (if the accumulator pressure is therefore to be adapted in the upward direction) only needs to be activated rarely. Therefore, the compressor running times can be shortened further compared to the compressor running times of the self-contained ride level control system known from DE 101 22 567 C1, and the compressor service life can accordingly be lengthened further.

According to a development of the invention, a ride level to which the motor vehicle is to be actually raised or lowered in accordance with the predefined value starting from the current ride level is predefined in order to control the accumulator pressure. The advantage of this development is the fact that it is necessary to adapt the accumulator pressure by filling or emptying the compressed air accumulator only if the later accumulator pressure (that is to say the accumulator pressure after the control process) would be outside a specific range. Therefore, if no ride level changes or only small ride level changes from the current ride level are requested in the motor vehicle over a long period of time, the accumulator pressure is not adapted at all over a correspondingly long period of time even though the accumulator pressure is possibly very low (for example owing to a low ambient temperature) or very high (for example owing to a high ambient temperature).

According to one development of the invention, at least one virtual ride level to which the motor vehicle can theoretically be raised or lowered starting from the current ride level is predefined in order to control the accumulator pressure. The advantage of this development is the fact that the virtual level can be predefined individually by the manufacturer of the motor vehicle.

According to one development, the quantity of air which is necessary to raise or lower the motor vehicle to the virtual ride level is calculated at specific time intervals with the ignition switched on. By using the calculated quantity of air it is then checked whether the later accumulator pressure would be within the desired range. If this is not the case, the compressed air accumulator is filled or emptied in order to ensure this. The advantage of this development is that it is ensured in short time intervals that it would be possible to raise or lower the motor vehicle to the predefined virtual ride level using the ride level control system.

According to one development of the invention, at least one ride level at which the motor vehicle is in a safe state in terms of vehicle movement dynamics is predefined as a virtual ride level. The advantage of this development is that it is ensured at all times that the motor vehicle can be raised or lowered to a ride level which is safe in terms of vehicle movement dynamics using the ride level control system.

One development is characterized in that if the later accumulator pressure were to be below the lower limiting value, before a control process compressed air is input into the compressed air accumulator at least to such an extent that the accumulator pressure after the control process corresponds at least to the lower limiting value, or if the later accumulator pressure were to be above the upper limiting value, compressed air is let out of the compressed air accumulator at least to such an extent that the accumulator pressure after the control process corresponds at least to the upper limiting value. The advantage of this development is the fact that compressed air is transferred into the compressed air accumulator or let out of it precisely to the extent necessary to maintain the limiting values. As a result, when the compressed air accumulator is filled only short compressor running times occur. Furthermore, it is ensured that the process of filling or emptying (which occurs before the actual control process using the ride level control system) takes up the shortest possible period of time so that the actual control process is not unnecessarily delayed.

According to one development of the invention, the upper and lower limiting values are determined by reference to the maximum admissible compressor current. The advantage of the development is the fact that the compressor cannot be damaged by an excessively high compressor current when the limiting values are maintained.

According to one development of the invention, the upper limiting value is determined by reference to the desired maximum adjustment speed, and the lower limiting value is determined by reference to the desired minimum adjustment speed of the ride level system. The advantage of this development is that the desired adjustment speeds are also maintained when the limiting values are complied with.

An advantage and further exemplary embodiments of the invention will be explained in conjunction with the figures.

DETAILED DESCRIPTION OF THE DRAWINGS

Figure 1:
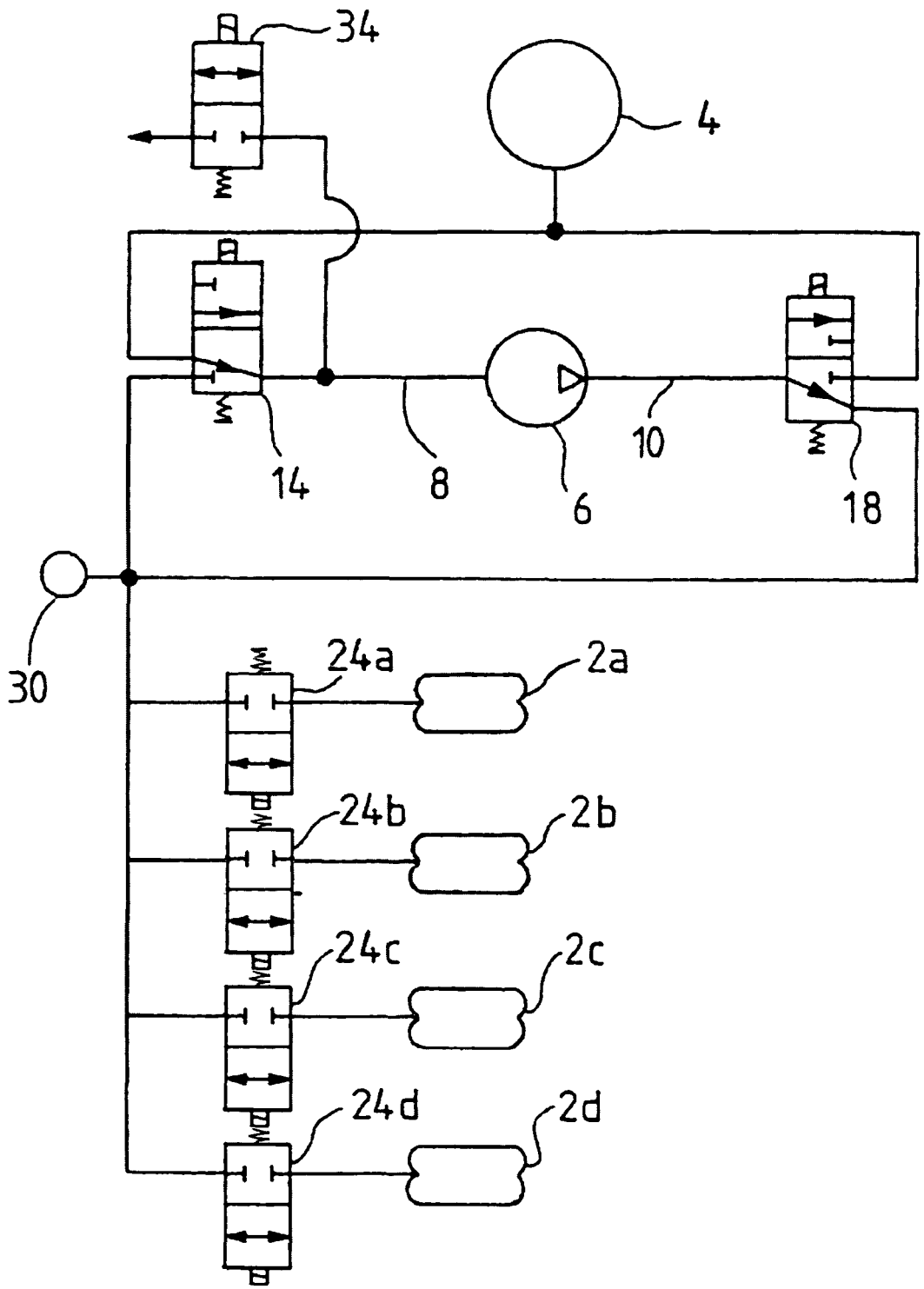
FIG. 1 shows a ride level control system in a schematic illustration.

FIG. 1 shows a self-contained ride level control system in a schematic illustration (detailed information about the design and method of operation of this ride level control system can be found in DE 199 59 556 C2). The ride level control system has air springs 2a to 2d and a compressed air accumulator 4. In addition, the ride level control system contains a compressor 6 which can at least feed compressed air from its inlet 8 to its outlet 10. The aforesaid components are connected to one another by means of compressed air lines in which controllable directional valves 14, 18 and 24a-24d are located. The text below explains, by reference to the air spring 2a, how compressed air can be transferred from the compressed air accumulator 4 into the air springs 2a to 2d via the compressor 6. Firstly, the controllable directional valve 24a is actuated by the control unit (not shown) of the ride level control system so that said directional valve 24a is transferred from the first switched state (shown in FIG. 1) into the second switched state. The compressor 6 is then actuated by the control unit so that said compressor 6 begins to run. Compressed air is then transferred into the air spring 2a from the compressed air accumulator 4 via the controllable directional valve 14, the compressor 6, the controllable directional valve 18 and the controllable directional valve 24a. If sufficient compressed air has been transferred into the air spring 2a (the vehicle body has therefore assumed the desired ride level in the region of the air spring 2a), the compressor 6 is in turn actuated by the control unit so that said compressor 6 stops running, and furthermore the controllable directional valve 24a is no longer energized so that it returns to the first switched state. The air springs 2b to 2d can be filled in a corresponding way with compressed air from the compressed air accumulator 4 (simultaneous filling from a plurality of air springs 2a to 2d is also possible here).

In the text which follows, an exemplary explanation is given, by reference to the air spring 2a of how compressed air can be transferred from the air springs 2a to 2d into the compressed air accumulator 4 via the compressor 6: firstly, the electrically controllable directional valves 14, 18 and 24a are actuated by the control unit of the ride level control system so that the latter change from the first switched state (shown in FIG. 1) into the second switched state. The compressor 6 is then actuated by the control unit so that said compressor 6 begins to run. Compressed air is then transferred from the air spring 2a into the compressed air accumulator 4 via the directional valve 24a, the directional valve 14, the compressor 6 and the directional valve 18. If sufficient compressed air has been let out of the air spring 2a into the compressed air accumulator 4 (if the vehicle body has therefore assumed the desired ride level in the region of the air spring 2a), the compressor 6 is actuated by the control unit so that said compressor 6 stops running. Furthermore, the controllable directional valves 14, 18 and 24a are no longer energized so that they return to the first switched state. The air springs 2b to 2d can be emptied into the compressed air accumulator 4 in a corresponding way (simultaneous emptying of a plurality of air springs 2a to 2d is also possible here).

If the compressed air accumulator 4 is to be filled with compressed air from the atmosphere, the controllable directional valves 34 and 18 are firstly actuated by the control unit of the ride level control system so that said directional valves 34 and 18 change from the first switched state (shown in FIG. 1) into the second switched state. The compressor is then actuated so that it begins to run. Air is then transferred into the compressed air accumulator 4 from the atmosphere via the directional valve 34, the compressor 6 and the directional valve 18. If no further air is to be transferred into the compressed air accumulator 4 from the atmosphere, the controllable directional valves 34 and 18 are no longer energized by the control unit so that said directional valves 34 and 18 return to the first switched state. Furthermore, the compressor 6 is no longer actuated so that it stops running.

In order to let out compressed air from the compressed air accumulator 4, the control unit of the ride level control system actuates the controllable directional valve 34 so that the latter changes from the first basic state (shown in FIG. 1) into the second switched state. The compressed air accumulator 4 can then be emptied into the atmosphere via the directional valves 14 and 34. If the compressed air accumulator 4 is not to be emptied further, the controllable directional valve 34 is not energized by the control unit of the ride level control system any more so that it returns to the first switched state shown.

In the text which follows there is an explanation of how the quantity of air L in the air springs 2a to 2d and the quantity of air L in the compressed air accumulator 4 are determined:

$$L_i = p_i V_i; \ i = 1 \text{ to } 4$$

$$L_s = P_s V_s$$

where:
$L_i$=Quantity of air in the air springs 2a to 2d
$p_i$=Pressure in the air springs 2a to 2d
$V_i$=Volumes of the air springs 2a to 2d
$L_s$=Quantity of air in the compressed air accumulator 4
$p_s$=Pressure in the compressed air accumulator 4
$V_s$=Volume of the compressed air accumulator 4.

With reference to the air spring 2a an explanation will be given as to how the pressure $p_i$ in the air springs 2a-2d can be determined with the pressure sensor: at first, the controllable directional valve 18 is actuated by the control unit so that it changes from the first switched state (shown in FIG. 1) into the second switched state. The air springs 2a to 2d are then disconnected completely from the compressor 6 and the compressed air accumulator 4. The control unit of the ride level control system then actuates the controllable directional valve 24a so that the latter changes from the first switched state (shown in FIG. 1) into the second switched state. The pressure in the air spring 2a is then present at the pressure sensor 30 so that it can be measured and passed on to the control unit of the ride level control system. If the pressure is not measured further, the directional valves 18 and 24a are no longer energized by the control unit so that said directional valves 18 and 24a are returned to the first switched state shown in FIG. 1. The pressure in the air springs 2b to 2d can be correspondingly measured.

In order to determine the volume $V_1$ in the air spring 2a, the spring compression state of the air spring 2a is measured with the height sensor (not shown) assigned to the air spring 2a and is passed on to the control unit of the ride level control system. In the control unit, data is stored indicating the volume of the air spring 2a which is associated with the instantaneous spring compression state of said air spring 2a so that the volume of the air spring 2a can be determined from the transmitted signal of the height sensor. The volume of the air springs 2b to 2d is ascertained in a corresponding way.

In order to determine the pressure in the compressed air accumulator 4, the controllable directional valves 14 and 18 firstly assume the first switched state shown in FIG. 1. The compressed air accumulator 4 is then connected via the latter to the pressure sensor 30 so that a pressure equalization then takes place between the compressed air accumulator 4 and the pressure sensor 30 if the pressure in the compressed air accumulator 4 is greater than in the pressure sensor 30. The controllable directional valves 14 and 18 are then transferred from the first switched state shown into the second switched state. The pressure sensor 30 is then connected to the compressed air accumulator 4 via the controllable directional valve 14, the compressor 6 and the controllable directional valve 18 so that a pressure equalization takes place between the pressure sensor 30 and the compressed air vessel 4 if the pressure at the pressure sensor 30 is greater than in the compressed air vessel 4. If the directional valves 14 and 18 are therefore changed into both switched states before the pressure measurement, the static air pressure in the compressed air accumulator 4 is present in any case at the pressure sensor 30 and can thus be measured by said pressure sensor 30. The pressure which is measured by the pressure sensor 30 is passed on to the control unit of the ride level control system.

The volume $V_s$ of the compressed air accumulator 4 is stored in the control unit of the ride level control system so that all the variables which are necessary to calculate the quantity of air L are now present in the control unit of the ride level control system.

Figure 2A:
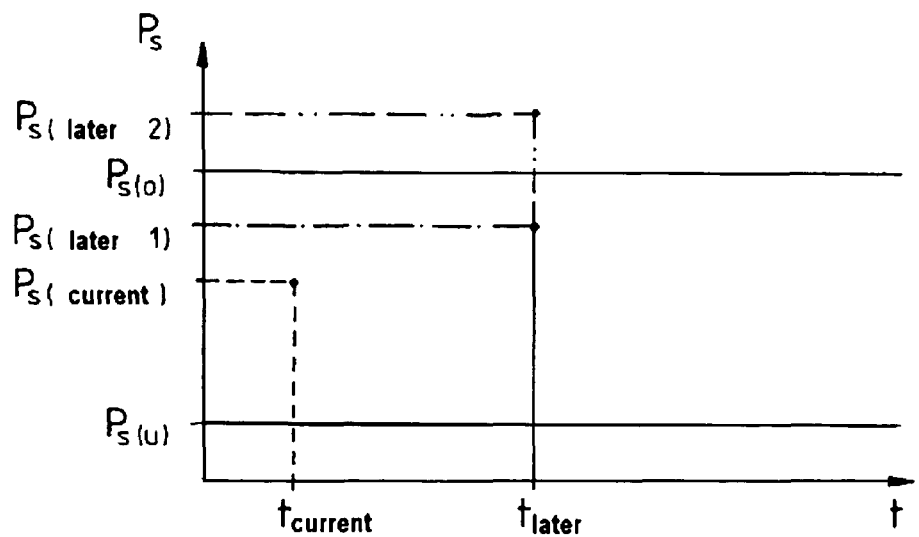
FIG. 2 is a diagram.

FIG. 2a shows a diagram in which the accumulator pressure $P_s$ is plotted over time t. The text which follows explains, in conjunction with FIG. 2a, how the accumulator pressure of the compressed air accumulator 4 of the ride level control system (see FIG. 1) is controlled when the vehicle body of the motor vehicle is to be lowered. Firstly, the current accumulator pressure $$p_{s(current)}$$

at the current time $t_{current}$ is determined, the determination being carried out in the way which has been explained in conjunction with FIG. 1 for the accumulator pressure. When the current accumulator pressure is determined, a ride level to which the vehicle body of the motor vehicle is to be lowered starting from the current ride level is predetermined. This will be explained by way of example for the case in which the vehicle body of the motor vehicle is to be lowered in the region of the air spring 2a (see FIG. 1). In this case, compressed air will have to be transferred into the compressed air accumulator 4 from the air spring 2a (see FIG. 1). The quantity of air which would have be let out of the air spring 2a in order to lower the vehicle body of the motor vehicle in the region of said air spring 2a is calculated as follows:

$$L_{ab} = p_1 V_1 (\text{Ride level 1}) - p_1 V_1 (\text{Ride level 2})$$

where:
$L_{ab}$: Quantity of air which has to be let out of the air spring 2a to lower the vehicle body
$p_1 V_1$ (Ride level 1): Quantity of air in the air spring 2a before the letting out process, and
$p_1 V_1$ (Ride level 2): Quantity of air in the air spring 2a after the letting out process.

The quantity of air in the air spring 2a before the letting out process is calculated in the way which has already been explained in conjunction with FIG. 1. The quantity of air in the air spring 2a which would be present after the letting out process can be determined on the basis of the quantity of air before the letting out process, for example by means of characteristic diagrams. The quantity of air $L_{ab}$ would have to be transferred from the air spring 2a into the compressed air accumulator 4 in order to lower the vehicle body in the region of the air spring 2a. As a result, the quantity of air in the compressed air accumulator 4 would be increased, as a result of which the accumulator pressure would rise. The accumulator pressure which would be present in the compressed air accumulator 4 after the quantity of air $L_{ab}$ has been transferred into it is calculated as follows:

$$p_{s(later)} = p_{s(current)} + L_{ab}/V_s$$

where:

$p_{s(later)}$: later accumulator pressure which would be present in the compressed air accumulator 4 after the quantity of air $L_{ab}$ has been transferred into it.

$p_{s(current)}$: accumulator pressure in the compressed air accumulator 4 before the letting out of compressed air from the air spring 2a $L_{ab}$: see above $V_s$: volume of compressed air accumulator 4.

The accumulator pressure $p_{s(later)}$ indicates how the accumulator pressure in the compressed air accumulator 4 would be if the control process were to be performed at the air spring 2a and the quantity of air $L_{ab}$ were to be transferred from the air spring 2a into the compressed air accumulator 4. After the accumulator pressure $p_{s(later)}$ has been calculated in the way explained, it is checked whether this accumulator pressure would lie above an upper limiting value $p_s$ (o) for the accumulator pressure in the compressed air accumulator 4. If the calculated later accumulator pressure is less than or equal to the upper limiting value (as is the case, for example, for the accumulator pressure $p_{s(later\ 1)}$ in FIG. 2a), the control process would be performed directly at the air spring 2a, and the quantity of air $L_{ab}$ would be transferred from the air spring 2a into the compressed air accumulator 4.

However, if the accumulator pressure $p_{s(later)}$ which is calculated in this way is greater than the upper limiting value (as is the case, for example, for the accumulator pressure $p_{s(later\ 2)}$ shown in FIG. 2a), before the control process at the air spring 2a compressed air is let out of the compressed air accumulator 4 into the atmosphere. Here, compressed air is let out of the compressed air accumulator 4 to such an extent that after the letting out process it is ensured that the later accumulator pressure (that is to say the accumulator pressure after the actual control process at the air spring 2a) corresponds to the upper limit $p_s$ (o) or is between the upper limit $p_s$ (o) and the lower limit $p_s$ (u) for the accumulator pressure. In order to achieve this, at least the following quantity of air is to be let out of the compressed air accumulator 4 into the atmosphere:

$$L_{ab(Accumulator)} \geq (p_{s(later)} - p_s(o))V_s$$

where:

$L_{ab(Accumulator)}$: Quantity of air which is to be let out of the compressed air accumulator 4 into the atmosphere.

The quantity of air $L_{ab(Accumulator)}$ which is to be let out can be measured, for example, with an airflow rate meter. It is also possible to regularly monitor the accumulator pressure in the compressed air accumulator 4 while the compressed air is being let out of the compressed air accumulator 4 for as long as compressed air is let out of the compressed air accumulator 4 until the accumulator pressure is less than or equal to $p_s$ (o).

After a corresponding quantity of air $L_{ab(Accumulator)}$ has been let out of the compressed air accumulator 4 into the atmosphere, the desired control process can be performed at the air spring 2a without the accumulator pressure in the compressed air accumulator 4 rising above the upper limit $p_s$ (o) during the control process.

Figure 2B:
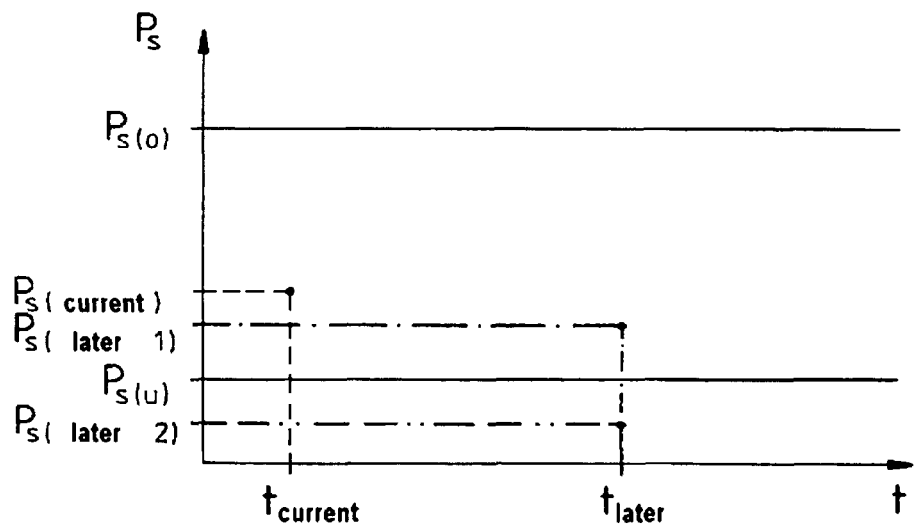

FIG. 2b shows a diagram in which the accumulator pressure $p_s$ in the compressed air accumulator 4 is also plotted over the time t. In conjunction with FIG. 2b, the text which follows explains how the accumulator pressure in the compressed air accumulator 4 is controlled if the vehicle body of the motor vehicle is to be raised. In this context, it is again assumed by way of example that the vehicle body is to be raised in the region of the air spring 2a. At first, the current accumulator pressure $p_s$ current is determined again. In addition, the ride level to which the vehicle body of the motor vehicle in the region of the air spring 2a is to be raised starting from the current ride level in the region of the air spring 2a is predefined. In order to raise the vehicle body in the region of the air spring 2a, a specific quantity of air would have to be transferred from the compressed air accumulator 4 into the air spring 2a, said quantity of air being calculated as follows:

$$L_{ab(Accumulator)} = p_1 V_1 (\text{Ride level 2}) - p_1 V_1 (\text{Ride level 1})$$

where:

$L_{ab(Accumulator)}$: Quantity of air which is to be let out of the compressed air accumulator 4 into the air spring 2a $p_1 V_1$ (Ride level 2): Quantity of air in the air spring 2a after the vehicle body has been raised $p_1 V_1$ (Ride level 1): Quantity of air in the air spring 2a before the control process.

As a result of the letting out of the quantity of air from the compressed air accumulator 4, the accumulator pressure in the compressed air accumulator 4 would change in the case of a control process as follows:

$$p_{s(later)} = p_{s(current)} - L_{ab(Accumulator)}/V_s$$

where $p_{s(later)}$ designates the later accumulator pressure in the compressed air accumulator 4 after the control process. If the result of the calculation of the later accumulator pressure is that said pressure would be greater than or equal to a lower limiting value $p_s$ (u) for the accumulator pressure, the control process is performed directly (this is the case, for example, for the later accumulator pressure $p_{s(later\ 1)}$ shown in FIG. 2b). If, on the other hand, the later accumulator pressure would be less than the lower limiting value $p_s$ (u) (as is the case, for example, for $p_{s(later\ 2)}$ in FIG. 2b), at first the control process is not performed. In this case, instead the compressed air accumulator 4 is firstly filled with a quantity of air from the atmosphere to such an extent that after the filling process, the later accumulator pressure in the compressed air accumulator 4 is greater than or equal to the lower limiting value. This means that at least the following quantity of air would be fed into the compressed air from the atmosphere:

$$L_{auf(Accumulator)} = (p_s(u) - P_{s(later)})V_s$$

where $L_{auf(Accumulator)}$ corresponds to the quantity of air to be fed in. After the corresponding quantity of air has been fed in it is ensured that after the control process the accumulator pressure in the compressed air accumulator 4 is greater than or equal to the lower limiting value $p_s$ (u) so that after compressed air has been fed into the compressed air accumulator 4 the control process can actually be performed.

During the process of controlling the accumulator pressure in the way mentioned above it is possible to specify a virtual ride level to which the vehicle body of the motor vehicle can be raised or lowered from the current ride level. This virtual ride level may be, for example, a ride level at which the motor vehicle is at a ride level which is safe in terms of vehicle movement dynamics. If the current ride level of the vehicle body is below the predefined virtual ride level, the accumulator pressure is controlled, as has been described in conjunction with FIG. 2a, the ride level 2 mentioned in said FIG. 2a corresponding in this case to the virtual ride level. The corresponding process of controlling the accumulator pressure can take place at regular time intervals. If sufficiently short time intervals are selected (for example every 10 to 120 seconds), it is ensured at all times that it is theoretically possible to raise the vehicle body into the safe driving state using the ride level control system. The same applies to the case in which the current ride level of the vehicle body of the motor vehicle is above the predefined virtual ride level. In this case, a control process takes place as has been described in conjunction with FIG. 2b, with the ride level 2 mentioned there corresponding in turn to the virtual ride level. In this case, the vehicle body is actually raised or lowered only if the ride level which is safe in terms of vehicle movement dynamics is necessary owing to a specific driving situation of the motor vehicle with the ride level control system (for example owing to a high speed).

It is also possible to predefine, for the control of the accumulator pressure, a ride level to which the vehicle body of the motor vehicle is to be actually raised or lowered starting from the current ride level.

List of Reference Numerals
(Part of the Description)
2a, . . . , 2d Air spring
4 Compressed air accumulator
6 Compressor
8 Inlet of the compressor
10 Outlet of the compressor
14 Controllable directional valve
18 Controllable directional valve
24a, . . . , 24d Controllable directional valves
30 Pressure sensor
34 Controllable directional valve

The invention claimed is:

1. A self-contained ride level control system for raising and lowering a motor vehicle self-contained ride level control system comprising:
 a compressor (6),
 a compressed air accumulator (4) operable for being filled with air from the atmosphere and emptying air into the atmosphere
 at least one air spring (2a-2d), the air spring (2a-2d) being connected to the compressed air accumulator (4) via the compressor (6) for transferring compressed air into the compressed air accumulator (4) from the air spring (2a-2d), and for exhausting the compressed air from the compressed air accumulator into the air spring (2a-2d), and
 a control unit;
 wherein the control unit is programmed to perform an accumulator pressure control as follows:
 the current accumulator pressure is determined,
 at least one ride level, for raising or lowering the motor vehicle to, is predefined,
 the quantity of air which is required to raise or lower the motor vehicle from the current ride level to the predefined ride level is determined,
 the later accumulator pressure by which the current accumulator pressure would be lowered if the motor vehicle were to be raised from the current ride level to the predefined ride level is determined or the later accumulator pressure to which the current accumulator pressure would rise if the motor vehicle were lowered from the current ride level into the predefined ride level is determined, and
 prior to flowing air into or out of the at least one air spring, the compressed air accumulator (4) is filled with compressed air if the later accumulator pressure would be below a lower limiting value, and the compressed air accumulator (4) is emptied if the later accumulator pressure would be above an upper limiting value.

2. The self-contained ride level control system as claimed in claim 1, wherein a ride level, to which the motor vehicle is to be actually raised or lowered in accordance with the predefined value starting from the current ride level, is stored in the control unit in order to control the accumulator pressure.

3. The self-contained ride level control system as claimed in claim 1, wherein at least one virtual ride level, to which the motor vehicle can theoretically be raised or lowered starting from the current ride level, is stored in the control unit in order to control the accumulator pressure.

4. The self-contained ride level control system as claimed in claim 3, wherein the control unit is programmed to calculate, at specific time intervals with the ignition switched on, the quantity of air which is necessary to raise or lower the motor vehicle to the virtual ride level.

5. The self-contained ride level control system as claimed in in claim 3, wherein at least one ride level, at which the motor vehicle is in a safe state in terms of vehicle movement dynamics, is stored in the control unit as one of the at least one virtual ride level.

6. The self-contained ride level control system as claimed in claim 1, wherein the control unit is programmed in a way that, if the later accumulator pressure were to be below the lower limiting value, before a control process compressed air is input into the compressed air accumulator (4) at least to such an extent that the accumulator pressure after the control process corresponds at least to the lower limiting value, or if the later accumulator pressure were to be above the upper limiting value, it controls the system to let compressed air out of the compressed air accumulator (4) at least to such an extent that the accumulator pressure after the control process corresponds at least to the upper limiting value.

7. The self-contained ride level control system as claimed in claim 1, wherein the upper limiting value is determined by reference to at least one of the two following quantities:
 maximum admissible compressor current,
 desired maximum adjustment speed of the ride level positions.

8. The self-contained ride level control system as claimed in claim 1, wherein the lower limiting value is determined by reference to at least one of the two following quantities:
 maximum admissible compressor current,
 desired maximum adjustment speed of the ride level positions.

9. A method for controlling a self-contained ride level control system for a motor vehicle, with which a current ride level of the motor vehicle can be raised and lowered and which system contains the following components:
 a compressor (6),
 a compressed air accumulator (4) operable for being filled with air from the atmosphere and emptying air into the atmosphere,
 at least one air spring (2a-2d), the air spring (2a-2d) being connected to the compressed air accumulator (4) via the compressor (6) for transferring compressed air into the compressed air accumulator (4) from the air spring (2a-

2d), and for exhausting the compressed air from the compressed air accumulator into the air spring (2a-2d), and a control unit;

wherein the method comprises the following steps:

determining a current accumulator pressure, determining the quantity of air which is required to raise or lower the motor vehicle from the current ride level to a predefined ride level, determining a later accumulator pressure to which the current accumulator pressure would change if the motor vehicle were to be raised or lowered from the current ride level to the predefined ride level filling the compressed air accumulator (4) with compressed air if the later accumulator pressure would be below a lower limiting value, and emptying the compressed air accumulator (4) if the later accumulator pressure would be above an upper limiting value.

* * * * *